(12) United States Patent
Wada

(10) Patent No.: US 11,483,508 B2
(45) Date of Patent: Oct. 25, 2022

(54) IMAGING APPARATUS, IMAGING SYSTEM, MOVING OBJECT, AND MANUFACTURING METHOD FOR IMAGING APPARATUS

(71) Applicant: CANON KABUSHIKI KAISHA, Tokyo (JP)

(72) Inventor: Yoichi Wada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/920,192

(22) Filed: Jul. 2, 2020

(65) Prior Publication Data

US 2020/0336687 A1  Oct. 22, 2020

Related U.S. Application Data

(63) Continuation of application No. 16/017,561, filed on Jun. 25, 2018, now Pat. No. 10,742,921.

(30) Foreign Application Priority Data

Jun. 29, 2017 (JP) .............................. JP2017-127978

(51) Int. Cl.
| H04N 5/378 | (2011.01) |
| H04N 5/374 | (2011.01) |
| H04N 17/00 | (2006.01) |
| H04N 5/369 | (2011.01) |
| H04N 5/367 | (2011.01) |
| H04N 5/361 | (2011.01) |

(52) U.S. Cl.
CPC ............ *H04N 5/378* (2013.01); *H04N 5/367* (2013.01); *H04N 5/3698* (2013.01); *H04N 5/3742* (2013.01); *H04N 17/002* (2013.01); *H04N 5/361* (2013.01)

(58) Field of Classification Search
CPC ...... H04N 5/378; H04N 5/367; H04N 5/3698; H04N 17/002; H04N 5/3742; H04N 5/361

See application file for complete search history.

(56) References Cited

U.S. PATENT DOCUMENTS

| 2010/0097486 | A1* | 4/2010 | Iwane | ................ H04N 9/04557 |
| | | | | 348/222.1 |
| 2012/0248293 | A1* | 10/2012 | Yamazaki | ......... H01L 27/14609 |
| | | | | 250/208.1 |
| 2018/0098010 | A1* | 4/2018 | Shikina | ................... H04N 5/378 |
| 2018/0098060 | A1* | 4/2018 | Igarashi | ................ H04N 5/367 |

FOREIGN PATENT DOCUMENTS

| JP | 2013-150232 A | 8/2013 |
| JP | 2016-048885 A | 4/2016 |
| WO | 2012/176390 A1 | 12/2012 |

* cited by examiner

*Primary Examiner* — Hung H Lam
(74) *Attorney, Agent, or Firm* — Canon U.S.A., Inc. IP Division

(57) ABSTRACT

In an imaging apparatus, each of a plurality of pixels has a first semiconductor area having a first conductivity type, a floating diffusion area, and a transfer gate positioned between the first semiconductor area and the floating diffusion area. In a part of the plurality of pixels, a partial area of the first semiconductor area receives a potential supplied from a contact. The part of the plurality of pixels further has a second semiconductor area having a second conductivity type positioned between the partial area and the transfer gate in a planar view.

19 Claims, 13 Drawing Sheets

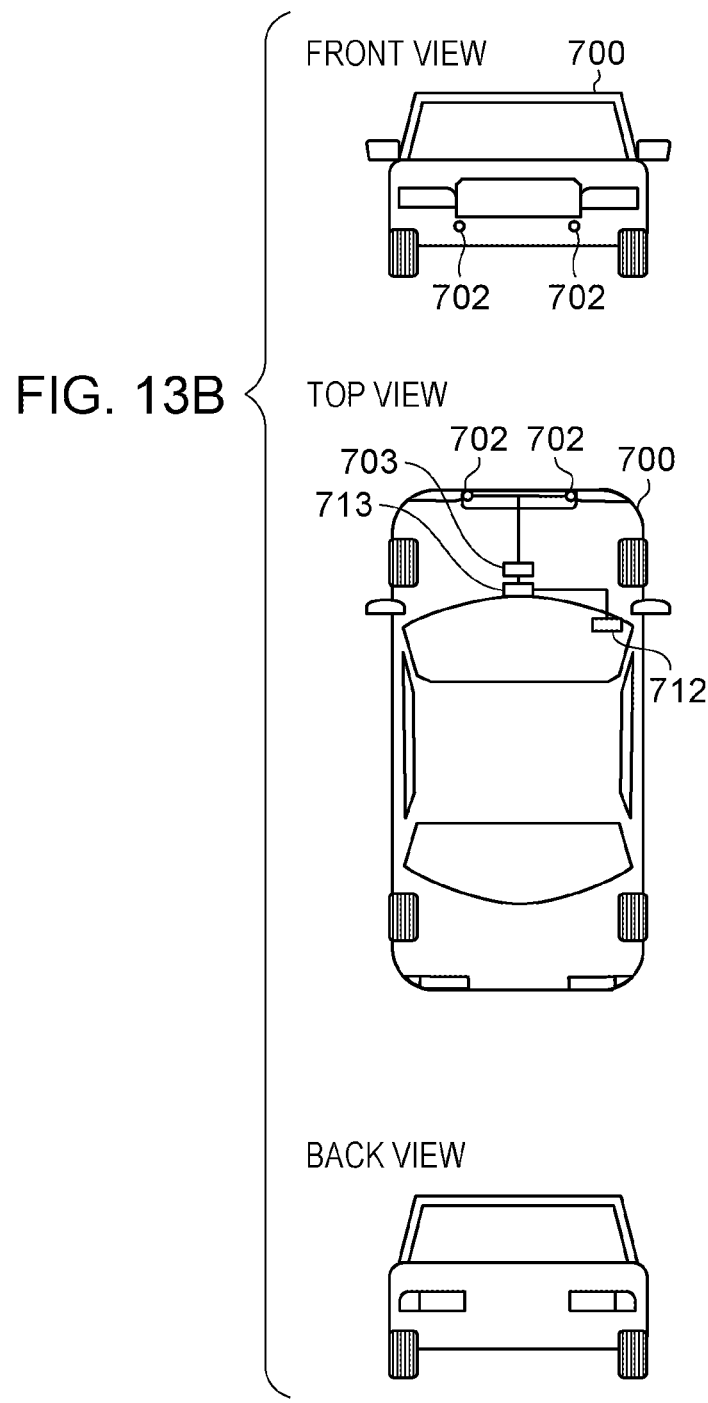

IMAGING APPARATUS, IMAGING SYSTEM, MOVING OBJECT, AND MANUFACTURING METHOD FOR IMAGING APPARATUS

CROSS-REFERENCE TO RELATED APPLICATION

This application is a Continuation of U.S. application Ser. No. 16/017,561, filed Jun. 25, 2018, which claims priority from Japanese Patent Application No. 2017-127978 filed Jun. 29, 2017, which are hereby incorporated by reference herein in their entireties.

BACKGROUND

Field of the Disclosure

The present disclosure relates to an imaging apparatus, an imaging system, a moving object, and a manufacturing method for the imaging apparatus.

Description of the Related Art

An imaging apparatus has been known which can output a signal for detecting a failure of the imaging apparatus itself.

Japanese Patent Laid-Open No. 2009-118427 discloses an imaging apparatus having a pixel with a photodiode (PD) (or pixel with PD) and a pixel without a photodiode (PD) (or pixels without PD).

Japanese Patent Laid-Open No. 2009-118427 further discloses that a failure in the imaging apparatus is detected by comparing an arrangement pattern of a pixel with PD and a pixel without PD and a pattern of signals actually output therefrom.

According to the technology disclosed in Japanese Patent Laid-Open No. 2009-118427, whether a signal acquired from a failure detection pattern area is matched with a predetermined pattern or not is judged. However, Japanese Patent Laid-Open No. 2009-118427 does not consider a pixel configuration which does not easily cause a pixel failure.

SUMMARY

According to an aspect of the present disclosure, an imaging apparatus includes a plurality of pixels on a semiconductor substrate. Each of the plurality of pixels has a first semiconductor area having a first conductivity type, a floating diffusion area having the first conductivity type, and a transfer gate positioned between the first semiconductor area and the floating diffusion area on a surface of the semiconductor substrate. In a part of the plurality of pixels, a partial area of the first semiconductor area receives a potential supplied from a contact. Each of the part of the plurality of pixels further has a second semiconductor area having a second conductivity type in an area between the first semiconductor area and the surface and between the partial area and the transfer gate in a planar view.

Further features of the present invention will become apparent from the following description of exemplary embodiments with reference to the attached drawings.

BRIEF DESCRIPTION OF THE DRAWINGS

FIGS. 13A and 13B are overall view illustrating a moving object.

BRIEF DESCRIPTION OF THE EMBODIMENTS

Figure 1:
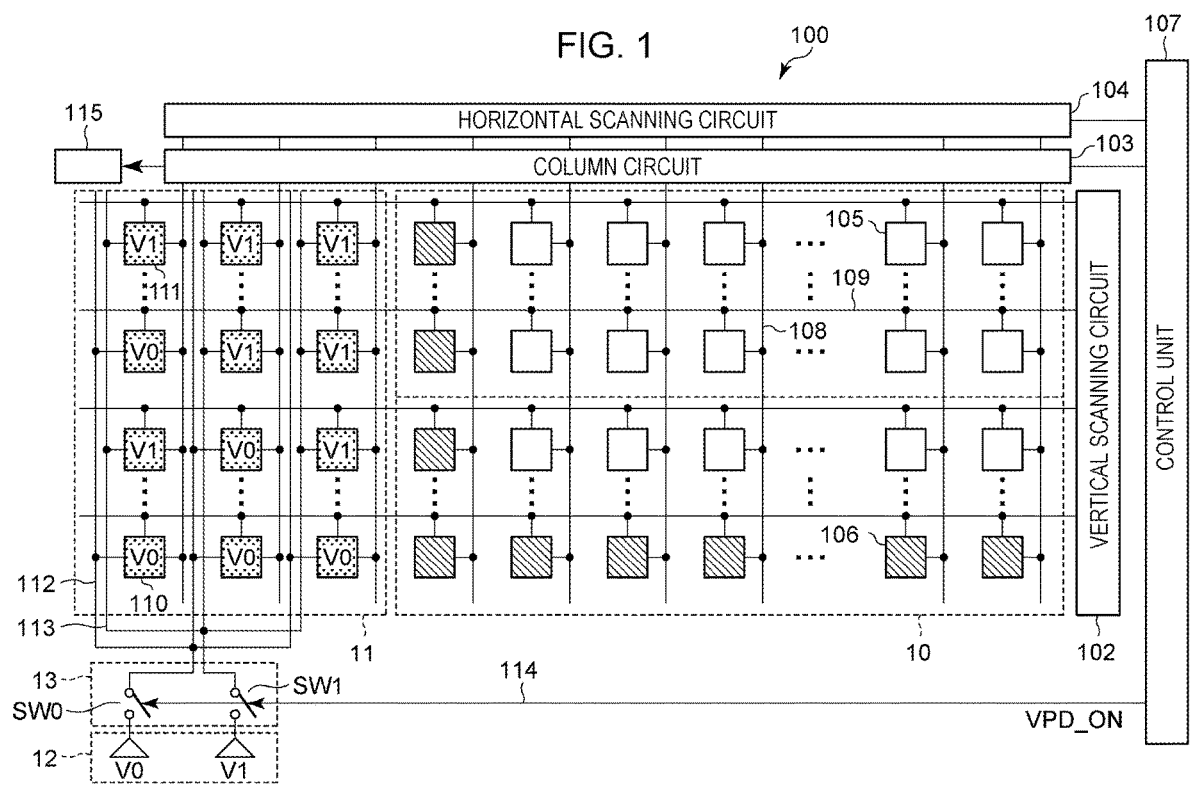
FIG. 1 is an overall view of an imaging apparatus.
Figure 2:
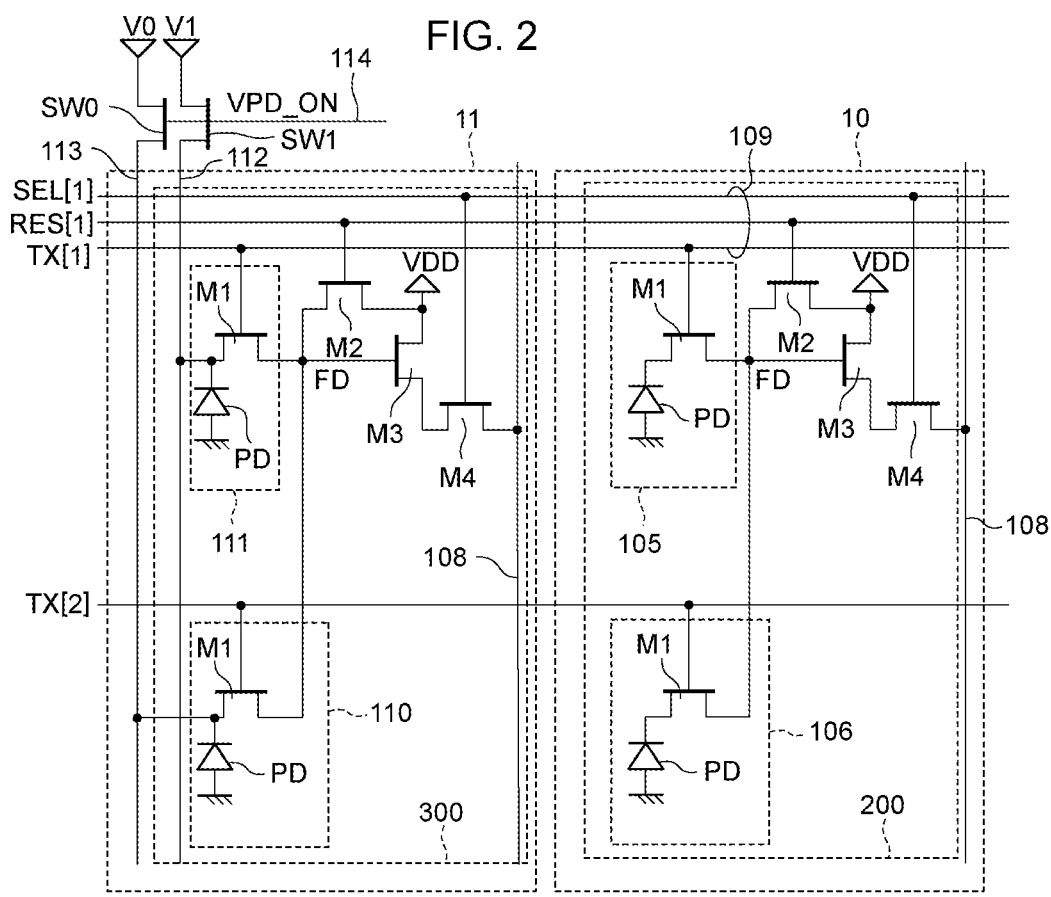
FIG. 2 is an equivalent circuit diagram illustrating an image acquisition pixel and a failure detection pixel.
Figure 3A:
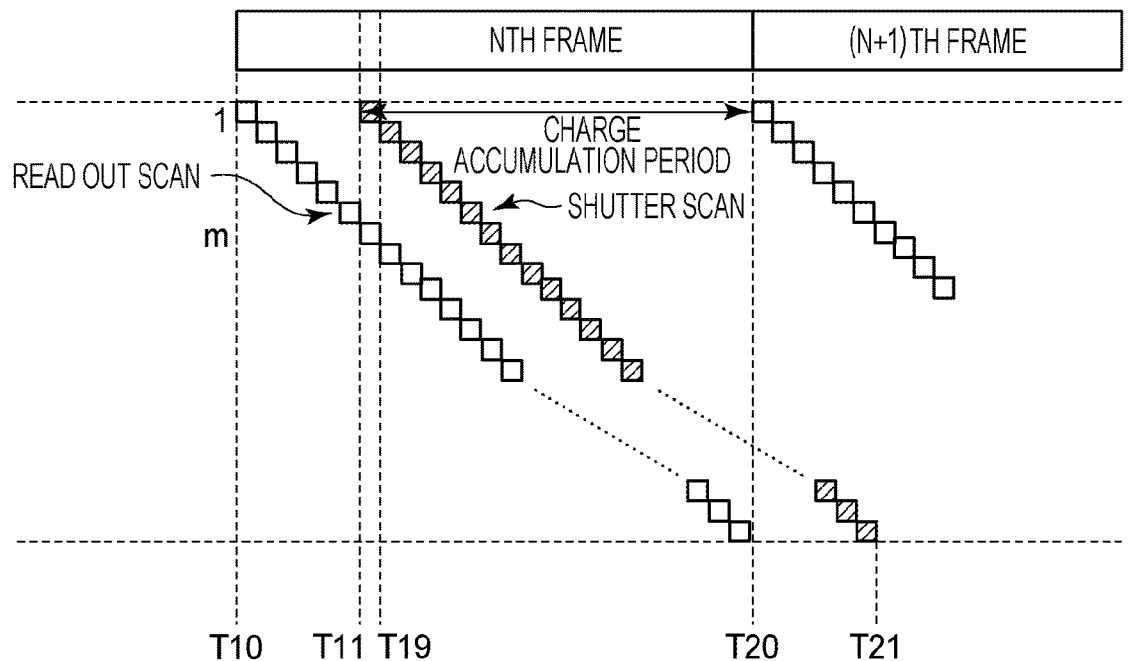
FIGS. 3A and 3B illustrate operations to be performed by pixels.
Figure 3B:
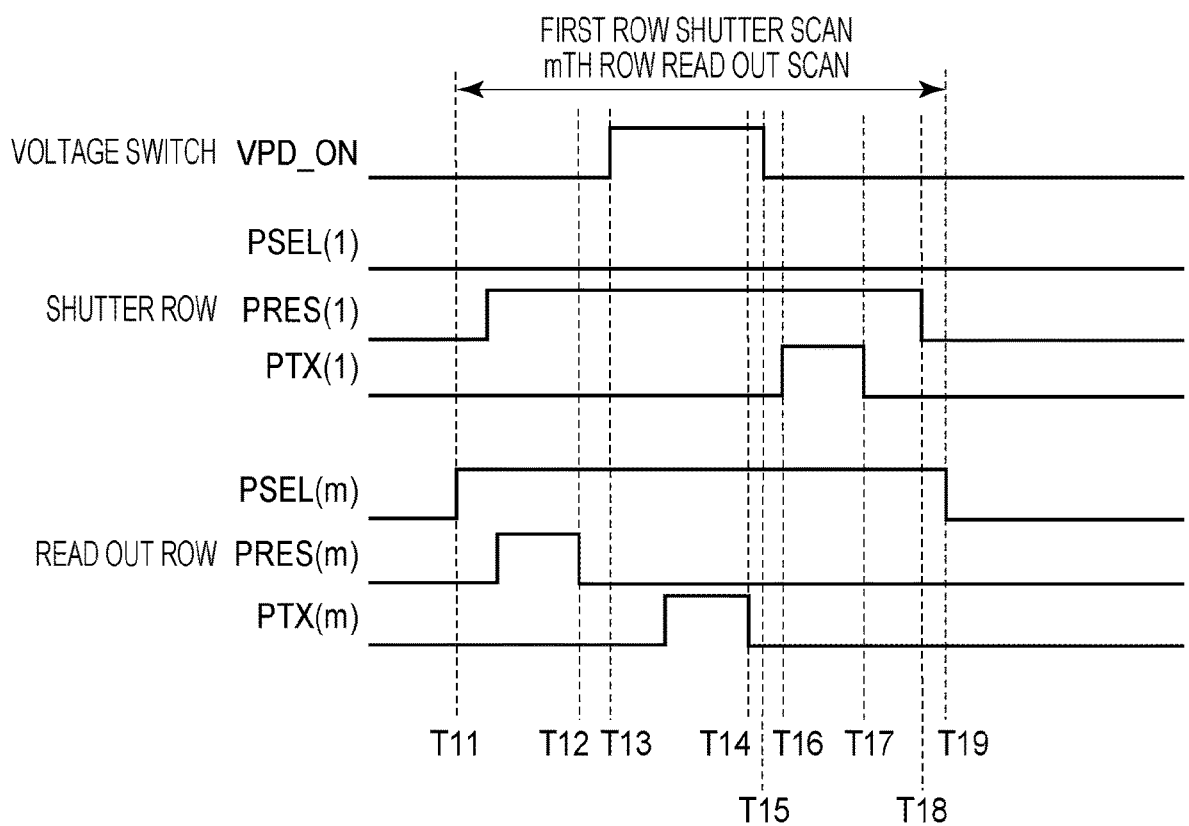

FIG. 1 is a block diagram illustrating a schematic configuration of an imaging apparatus according to a first embodiment. FIG. 2 is a circuit diagram illustrating an example of a configuration of pixels in the imaging apparatus according to this embodiment. FIGS. 3A and 3B are timing charts illustrating a driving method for the imaging apparatus according to this embodiment.

First of all, a structure of the imaging apparatus according to this embodiment will be described with reference to FIGS. 1 and 2.

An imaging apparatus 100 according to this embodiment includes a first area 10, a second area 11, a vertical scanning circuit 102, a column circuit 103, a horizontal scanning circuit 104, an output circuit 115, a control unit 107, a voltage supply unit 12, and a voltage switch 13, as illustrated in FIG. 1.

The first area 10 has pixels 105 of a first group and pixels 106 of a second group arranged in a plurality of rows and a plurality of columns. The first area 10 is an image acquisition pixel area having pixels for acquiring an image. Each of the pixels 105 is a pixel having a photoelectric conversion unit and is represented by a white block in FIG. 1. Each of the pixels 106 is a pixel having a light-shielded photoelectric conversion unit and is represented by a shaded block in FIG. 1. Each of the pixels 106 is a pixel configured to output a reference signal that is a reference for a black level and is typically placed on a periphery of the first area 10. The pixels 106 may not necessarily be provided.

The second area 11 has pixels 110 of a third group and pixels 111 of a fourth group arranged in a plurality of rows and a plurality of columns. The second area 11 is a failure detection pixel area having pixels for failure detection. Each of the pixels 110 is configured to output a signal depending on a potential of a fixed voltage terminal V0 and is represented by a block labeled "V0" in FIG. 1. Each of the pixels 111 is a pixel configured to output a signal depending on a potential of a fixed voltage terminal V1 and is represented by a block labeled "V1" in FIG. 1.

The first area 10 and the second area 11 are placed next to each other in a row direction (horizontal direction in FIG. 1), and the first area 10 and the second area 11 are arranged in the same row but in different columns.

Pixel control lines 109 extending in the row direction are arranged in rows of the first area 10 and the second area 11. The pixel control line 109 in each row is a signal line common to the pixels 105, 106, 110, and 111 belonging to the row. The pixel control lines 109 are connected to the vertical scanning circuit 102.

Vertical output lines 108 extending in the column direction are arranged in columns of the first area 10 and the second area 11. The vertical output line 108 of each column of the first area 10 is a signal line common to the pixels 105 and 106 belonging to the column. The vertical output line 108 of each column of the second area 11 is a signal line common to the pixels 110 and 111 belonging to the column. The vertical output lines 108 are connected to the column circuit 103.

The vertical scanning circuit 102 is configured to supply a predetermined control signal for driving the pixels 105, 106, 110, and 111 through the pixel control lines 109. The vertical scanning circuit 102 may be a logic circuit such as a shift register or an address decoder. Though FIG. 1 illustrates the pixel control line 109 of each row represented by one signal line, a plurality of control signal lines are included therein in reality. The pixels 105, 106, 110, and 111 of a row selected by the vertical scanning circuit 102 operate to output signals to the corresponding vertical output lines 108.

The column circuit 103 is configured to amplify pixel signals output to the vertical output lines 108 and to perform correlated double sampling processing based on signals upon reset and signals upon photoelectric conversion. Correlated double sampling processing based on the signals upon reset and signals upon input of fixed voltage is performed on pixel signals output from the pixels 110 and 111 for failure detection in the same manner performed on signals from the pixels 105 and 106 for image acquiring.

The horizontal scanning circuit 104 is configured to supply control signals to the column circuit 103. In this case, the control signals are supplied for transferring pixel signals processed in the column circuit 103 to the output circuit 115 sequentially column by column.

The output circuit 115 includes a buffer amplifier and a differential amplifier and is configured to output pixel signals transferred from the column circuit 103 to a signal processing unit (not illustrated) external to the imaging apparatus 100. The column circuit 103 or the output circuit 115 may have an AD conversion unit to output digital image signals to an external unit.

The voltage supply unit 12 is a power supply circuit configured to supply potentials of predetermined fixed voltage terminals V0 and V1. The voltage switch 13 includes switches SW0 and SW1. The switch SW0 is provided between the fixed voltage terminal V0 of the voltage supply unit 12 and the voltage supply line 112 and is configured to supply a potential of the fixed voltage terminal V0 to the voltage supply line 112 in response to a control signal (VPD_ON) supplied from the control unit 107 through the control signal line 114. The switch SW1 is provided between the fixed voltage terminal V1 of the voltage supply unit 12 and the voltage supply line 113 and supplies a potential of the fixed voltage terminal V1 to the voltage supply line 113 in response to a control signal (VPD_ON) supplied from the control unit 107 through the control signal line 114.

The voltage supply lines 112 and 113 are configured to supply potentials of the fixed voltage terminals V0 and V1 from the voltage supply unit 12 to the pixels 110 and 111 in the second area 11. The voltage supply lines 112 and 113 are shared by a plurality of pixels 110 and 111 within the second area 11, for example, as illustrated in FIG. 1, to reduce the scale of the circuit.

The second area 11 has the pixels 110 and the pixels 111 in a matrix shape based on a specific pattern. A potential of the fixed voltage terminal V0 is supplied to the pixels 110. A potential of the fixed voltage terminal V1 different from the potential of the fixed voltage terminal V0 is supplied to the pixels 111.

Describing an example in which the second area 11 has three columns, the pixels 110, 110, 110 are provided in each column of one row (such as the lowest row in FIG. 1), for example. The pixels 111, 110, 111 are provided in each column of another row (such as the second row from the bottom in FIG. 1). In other words, the pattern of fixed voltage to be applied to the pixels 110 and 111 changes in accordance with the row of vertical scan.

The pixels 110 for failure detection and the pixels 105 for image acquisition belonging to one row share the pixel control line 109. Thus, whether the vertical scanning circuit 102 is operating normally or is operating abnormally and is scanning a row that is different from an expected one can be detected by comparing the pattern of the output in the second area 11 and an expected value.

According to this embodiment, the second area 11 has three columns, for example. However, it is not intended that the number of columns in the second area 11 be limited to three.

FIG. 2 is a circuit diagram illustrating examples of configurations of pixels 105, 106, 110, 111 in the first area 10 and the second area 11. FIG. 2 illustrates extracted pixels including the pixel 105 provided in the first row and the pixel 106 provided in the second row of one column in the first area 10 and the pixel 111 provided in the first row and the pixel 110 provided in the mth row of one column in the second area 11.

Each of the pixels 105 provided in the first area 10 includes a photoelectric conversion unit PD and a transfer transistor M1. A pixel cell 200 has two pixels 105. The pixel cell 200 includes a reset transistor M2, an amplification transistor M3, and a selection transistor M4. The photoelectric conversion unit PD may be a photodiode, for example. The photodiode corresponding to the photoelectric conversion unit PD has an anode connected to a reference voltage terminal GND and a cathode connected to a source of the transfer transistor M1. The transfer transistor M1 has a drain connected to a source of the reset transistor M2 and a gate of the amplification transistor M3. The connection node of the drain of the transfer transistor M1, the source of the reset transistor M2, and the gate of the amplification transistor M3 configure a floating diffusion FD. A drain of the reset transistor M2 and a drain of the amplification transistor M3 are connected to a power supply voltage terminal VDD. The amplification transistor M3 has a source connected to a drain of the selection transistor M4. The selection transistor M4 has a source connected to the vertical output line 108. The pixel 105 of the first row and the pixel 105 of the second row share the floating diffusion FD that is an input node of the gate of one amplification transistor M3.

Each of the pixel 110 and pixel 111 provided in the second area 11 includes the light-shielded photodiode PD and the transfer transistor M1. A pixel cell 300 has the pixel 110 and the pixel 111. The pixel cell 300 further includes the reset transistor M2, the amplification transistor M3, and the selection transistor M4. The transfer transistor M1 of the pixel 111 has a source connected to the voltage supply line 112. The pixel 111 will be described below. The transfer transistor M1 has a drain connected to a source of the reset transistor M2 and a gate of the amplification transistor M3. The connection node of the drain of the transfer transistor M1, the source of the reset transistor M2, and the gate of the amplification transistor M3 configure a floating diffusion FD. A drain of the reset transistor M2 and a drain of the amplification transistor M3 are connected to the power supply voltage terminal VDD. The amplification transistor M3 has a source connected to a drain of the selection transistor M4. The selection transistor M4 has a source connected to the vertical output line 108. The pixel 111 of the first row and the pixel 111 of the second row share the floating diffusion FD that is an input node of the gate of one amplification transistor M3.

The pixel 110 provided in the second area 11 has the transfer transistor M1 having a source connected to the voltage supply line 113 instead of the voltage supply line 112.

In the pixel configuration illustrated in FIG. 2, the pixel control line 109 provided for each row includes signal lines TX, RES, and SEL. The signal line TX is connected to the gate of the transfer transistor M1 of each pixel belonging to the corresponding row. The signal line RES is connected to the gate of the reset transistor M2 of each pixel belonging to the corresponding row. The signal line SEL is connected to the gate of the selection transistor M4 of each pixel belonging to the corresponding row. Referring to FIG. 2, a row number is added to a reference of a signal line (such as SEL(1) and RES(1)).

The signal line TX receives a control signal PTX output as a drive pulse for controlling the transfer transistor M1 from the vertical scanning circuit 102. The signal line RES receives a control signal PRES output as a drive pulse for controlling the reset transistor M2 form the vertical scanning circuit 102. The signal line SEL receives a control signal PSEL output as a drive pulse for controlling the selection transistor M4 from the vertical scanning circuit 102. In a case where each of the transistors is an N type transistor, when a high-level control signal is supplied from the vertical scanning circuit 102, the corresponding transistor is turned on. When a low-level control signal is supplied from the vertical scanning circuit 102, the corresponding transistor is turned off.

The photoelectric conversion unit PD included in each of the pixels 105 for image acquisition converts (photoelectrically converts) incident light to electric charges the amount of which depends on the light quantity and accumulates the generated electric charges. The transfer transistor M1 in each of the pixels 105 is turned on to transfer the electric charges in the photoelectric conversion unit PD to the floating diffusion FD. The floating diffusion FD has a capacitor which performs charge-voltage conversion to voltage depending on the amount of electric charges transferred from the photoelectric conversion unit PD. The transfer transistors M1 in the pixels 110 and 111 are turned on to apply voltage supplied from the voltage supply lines 112 and 113 to the floating diffusion FD. The amplification transistor M3 has the drain that receives power supply voltage and the source that receives bias electric current from a current source, not illustrated, through the selection transistor M4, which configures an amplifying unit (source follower circuit) having the gate as its input node. Thus, the amplification transistor M3 outputs a signal based on the voltage of the floating diffusion FD to the vertical output line 108 through the selection transistor M4. The reset transistor M2 is configured to be turned on to reset the floating diffusion FD to voltage depending on the power supply voltage VDD.

Pixels of one row in the first area 10 and the second area 11 are configured to receive common control signals PTX, PRES, and PSEL from the vertical scanning circuit 102. For example, control signals PTX(m), PSEL(m), and PRES(m) are supplied to the transfer transistor M1, the reset transistor M2, and the selection transistor M4 in the pixels 105, 106, 110, and 111 of the mth row.

Next, a driving method for the imaging apparatus according to this embodiment will be described with reference to FIGS. 3A and 3B. FIG. 3A is a timing chart illustrating a relationship between read-out scan and shutter scan during one frame period. FIG. 3B is a timing chart illustrating details of operations to be performed by pixels for scanning a read-out scan row and a shutter scan row.

FIG. 3A schematically illustrates operations of an Nth frame which starts at a time T10 and ends at a time T20 and an (N+1)th frame which starts from the time T20. The operations of the frames include a read-out scan which row-sequentially performs a read-out operation from the pixels 105, 106, 110, and 111 and a shutter scan which row-sequentially starts electric-charge accumulation to the photoelectric conversion units PD in the pixels 105 and 106.

The read-out scan of the Nth frame starts at the time T10 and ends at the time T20. The time T10 is a starting time of the read-out operation performed on the pixels of the first row, and the time T20 is the ending time of the read-out operation performed on the pixels of the last row.

The shutter scan of the Nth frame starts at a time T11 and ends at a time T21. The time T11 is the starting time of the shutter operation performed on the pixels of the first row, and the time T21 is the ending time of the shutter operation performed on the pixels of the last row. The period from the starting time of the shutter operation to the starting time of the next read-out operation corresponds to a charge accumulation period. With focus on the first row, for example, the period from the time T11 to the time T20 corresponds to a charge accumulation period. The starting time of the shutter operation can be controlled to control the charge accumulation period.

Here, the read-out operation from pixels of the mth row starts at the time T11 when the shutter operation performed on the pixels of the first row starts. The shutter operation performed on the pixels of the first row and a read-out operation from the pixels 106 of the mth row end at a time T19.

FIG. 3B illustrates operations of pixels during a period from the time T11 to the time T19 in detail. The pixels operate in the same manner both in the shutter operation and the read-out operation.

At the time T11, the control signal PSEL(m) for the read-out scan row (mth row) is changed to have a high level, and the selection transistors M4 of the pixels of the read-out scan row are turned on. Because of this operation, signals can be read out from pixels of the read-out scan row to the vertical output line 108.

Next, during a period from the time T11 to a time T12, the control signal PRES(1) for the shutter scan row (first row) and the control signal PRES(m) for the read-out scan row are changed to have a high level. Because of this operation, the reset transistors M2 in pixels of the shutter scan row and the read-out scan row are turned on to reset the floating diffusion FD.

Next, at the time T12, the control signal PRES(m) to the read-out scan row is changed to a low level so that the reset transistor M2 of each of the pixels of the read-out scan row is turned off. This operation outputs the electric charges from the floating diffusion FD to the power supply voltage terminal VDD, and the voltage of the floating diffusion FD is amplified by a source follower operation and is read out to the vertical output line 108.

Next, at a time T13, the control signal VPD_ON is changed to a high level so that the switches SW0 and SW1 of the voltage switch 13 are turned on. Potentials of the fixed voltage terminals V0 and V1 are supplied from the voltage supply unit 12 to the voltage supply lines 112 and 113.

Next, during a period from the time T13 to a time T14, the control signal PTX(m) to the read-out scan row is changed to have a high level so that the transfer transistor M1 of each of the pixels of the read-out scan row is turned on. This operation transfers the electric charges accumulated in the photoelectric conversion units PD in the pixels 105 and 106 of the read-out scan row to the floating diffusion FD. In the pixels 110 and 111 of the read-out scan row, the potentials of the fixed voltage terminals V0 and V1 supplied from the voltage supply unit 12 are written in the floating diffusion FD.

Next, at the time T14, the control signal PTX(m) to the read-out scan row is changed to have a low level so that the transfer transistor M1 of each of the pixels of the read-out scan row is turned off. This operation settles the voltage of the floating diffusions FD of the read-out scan row, and the settled voltage is amplified by a source follower operation and is read out to the vertical output line 108.

Next, at a time T15, the control signal VPD_ON is changed to have a low level so that the switches SW0 and SW1 of the voltage switch 13 are turned off, which thus blocks the supply of the potentials of the fixed voltage terminals V0 and V1 from the voltage supply unit 12 to the voltage supply lines 112 and 113.

Next, at a time T16, the control signal PTX(1) to the shutter scan row is changed to have a high level so that the transfer transistor M1 of each of the pixels of the shutter scan row is turned on. In this case, because the reset transistor M2 of the pixels of the shutter scan row also has an ON state, the electric charges in the photoelectric conversion unit PD are output to the power supply voltage terminal VDD through the transfer transistor M1 and the reset transistor M2.

Next, at a time T17, the control signal PTX(1) to the shutter scan row is changed to have a low level, and the transfer transistor M1 of each of the pixels of the shutter scan row is turned off. At a time T18, the control signal PRES(1) to the shutter scan row is changed to have a low level, and the reset transistor M2 of each of the pixels of the shutter scan row is turned off. This operation completes the shutter operation performed on the shutter scan row.

Next, at a time T19, the control signal PSEL(m) to the read-out scan row is changed to have a low level, and the selection transistor M4 of each of the pixels of the read-out scan row is turned off. This operation cancels the selection of the pixels of the read-out scan row and completes the read-out operation on the read-out scan row.

According to this embodiment, as described above, during a period when the transfer transistors M1 of the shutter scan row are being turned on, the switches SW0 and SW1 of the voltage switch 13 are turned off (changing the control signal VPD_ON to have a low level). Reasons for this will be described below.

In order to completely remove the electric charges in the photoelectric conversion units PD of the pixels 105 and 106 in the first area 10 by performing the shutter operation, the reset transistors M2 and the transfer transistors M1 of the shutter scan row may be simultaneously turned on. Particularly, in a case where the saturation charge quantity of the photoelectric conversion units PD exceeds the saturation charge quantity of the floating diffusion FD, the reset transistor M2 and the transfer transistor M1 are to be turned on simultaneously.

However, in this state, keeping the voltage supply from the voltage supply unit 12 to the pixels 110 and 111 in the second area 11 that is a failure detection pixel area results in a short circuit between the fixed voltage terminals V1 and V0 and the power supply voltage terminal VDD. Typically, because the potential of the fixed voltage terminal V1 is equal to about 1.6 V and the power supply voltage VDD is equal to 3.3 V, a flow of a short-circuit current may cause a bad influence such as incorrect reading of the potentials of the pixels 110 and 111 in the second area 11.

According to this embodiment, the voltage switch 13 is provided between the voltage supply unit 12 and the pixels 110 and 111 in the second area 11. The switches SW0 and SW1 of the voltage switch 13 are driven to be turned off when the transfer transistors M1 of the shutter scan row are turned on.

This can avoid establishment of a short circuit between the fixed voltage terminals V0 and V1 and the power supply voltage terminal VDD during a shutter scan operation, which can increase the accuracy of detection of a failure. In other words, the avoidance of a short circuit between voltage terminals in a shutter scan operation can provide an effect that imaging and the failure detection can be performed in real time, and that, at the same time, the accuracy of detection of a failure can be increased.

According to this embodiment, the time for turning on the transfer transistors M1 of the shutter scan row is after the time for turning on the transfer transistors M1 of the read-out scan row. This embodiment is not necessarily limited to the operation. In other words, the time for turning on the transfer transistors M1 of the shutter scan row may be before the time for turning on the transfer transistors M1 of the read-out scan row.

Top View of Pixels

Figure 4:
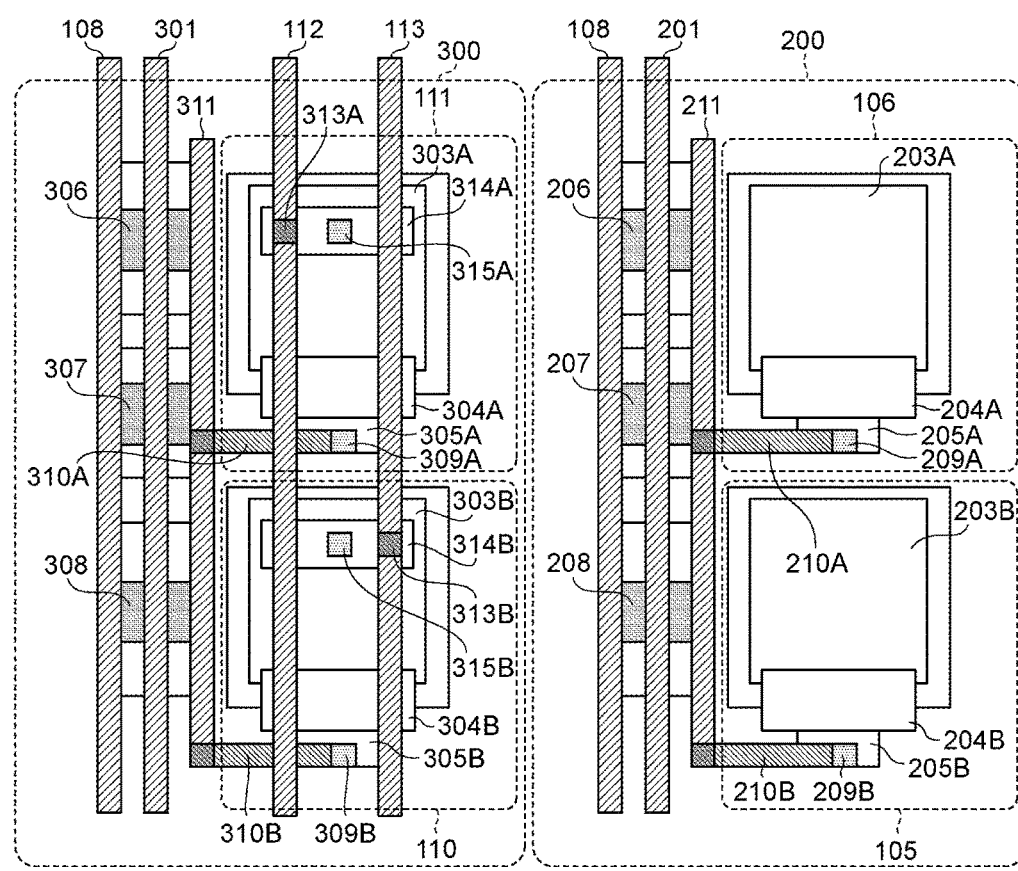
FIG. 4 is a top view of pixels.

FIG. 4 illustrates a top view of the pixels 105, 110, and 111. Like numbers refer to like components having like functionality in FIG. 2 and FIG. 4.

A pixel power supply line 201 is configured to transmit power supply voltage VDD to pixels for image acquisition. The pixel cell 200 has semiconductor areas 203A and 203B which are parts of the photoelectric conversion unit PD. The semiconductor areas 203A and 203B correspond to an electric charge accumulation unit configured to accumulate electric charges generated by a photoelectric conversion. It is assumed here that the conductivity type of the semiconductor areas 203A and 203B is an N type. It is also assumed that the electric charges to be accumulated in the semiconductor areas 203A and 203B are electrons.

The pixel cell 200 further includes gates 204A and 204B of the transfer transistors M1 and floating diffusion areas 205A and 205B that are components of an floating diffusion (hereinafter, FD). The pixel cell 200 further includes a gate 206 of the selection transistor M4, a gate 207 of the amplification transistor M3, and a gate 208 of the reset transistor M2. The pixel cell 200 further includes FD connection contacts (hereinafter, each contact will be called a CNT) 209A and 209B, FD connection lines 210A and 210B, and an FD connection line 211. Hereinafter, a gate of the reset transistor, a gate of a transfer transistor, a gate of an amplification transistor, a gate of a selection transistor will be called a reset gate, a transfer gate, an amplification gate, and a selection gate, respectively.

The semiconductor area 203A is connected to the floating diffusion area 205A through the transfer gate 204A. The electric charges accumulated in the semiconductor area 203A are transferred to the floating diffusion area 205A through the transfer gate 204A. The floating diffusion area 205A is connected to the amplification gate 207 through the FD connection CNT 209A, the FD connection line 210A, and the FD connection line 211.

The semiconductor area 203B is connected to the floating diffusion area 205B through the transfer gate 204B. The electric charges accumulated in the semiconductor area 203B are transferred to the floating diffusion area 205B through the transfer gate 204B. The floating diffusion area 205B is connected to the amplification gate 207 through the FD connection CNT 209B, the FD connection line 210B, and the FD connection line 211.

The floating diffusion area 205A is connected to the reset transistor M2 through the FD connection CNT 209A, the FD connection line 210A, and the FD connection line 211. The floating diffusion area 205B is connected to the reset transistor M2 through the FD connection CNT 209B, the FD connection line 210B, and the FD connection line 211.

A pixel power supply line 301 is configured to transmit power supply voltage VDD to the pixels for failure detection.

The pixel cell 300 for failure detection has semiconductor areas 303A and 303B that are components of a light-shielded photoelectric conversion units PD. The pixel cell 300 has transfer gates 304A and 304B, floating diffusion areas 305A and 305B, a selection gate 306, an amplification gate 307, and a reset gate 308.

The pixel cell 300 further includes FD connection CNT 309A and 309B, FD connection lines 310A and 310B, an FD connection line 311, and voltage supply lines 112 and 113. The pixel cell 300 further includes VIAs 313A and 313B for failure detection, failure detection lines C 314A and 314B, and failure detection CNTs 315A and 315B.

The voltage supply line 112 and the voltage supply line 113 are placed above the photoelectric conversion unit PD in the pixel cell 300. In other words, in a planar view, the voltage supply line 112 and the photoelectric conversion unit PD overlap, and the voltage supply line 113 and the photoelectric conversion unit PD overlap.

The voltage supply line 112 is connected to the failure detection line C314A through the failure detection VIA 313A. The failure detection line C314A is connected to the semiconductor area 303A through the failure detection CNT 315A.

A potential applied from the voltage supply line 112 to the semiconductor area 303A is output to the floating diffusion area 305A through the transfer transistor M2.

The voltage supply line 113 is connected to the failure detection line C 314B through the failure detection VIA 313B. The failure detection line C 314B is connected to the semiconductor area 303B through the failure detection CNT 315B.

A potential applied from the voltage supply line 113 to the semiconductor area 303B is output to the floating diffusion area 305B through the transfer transistor M2.

The amplification transistor M3 outputs a signal depending on the potential of the amplification gate 307 to the vertical output line 108 through the selection transistor M4.

The floating diffusion area 305A is connected to the reset transistor M2 through the FD connection CNT 309A, the FD connection line 310A, and the FD connection line 311. The floating diffusion area 305B is connected to the reset transistor M2 through the FD connection CNT 309B, the FD connection line 310B, and the FD connection line 311.

The signal output from the pixel cell 300 for failure detection has a level depending on the potential of the voltage supply line 112 or the voltage supply line 113.

Top View and Cross-Sectional View of Photoelectric Conversion Unit

The upper side of the pixels described with reference to FIG. 4 will be described with focus of the photoelectric conversion unit and with reference to FIG. 5.

Figure 5:
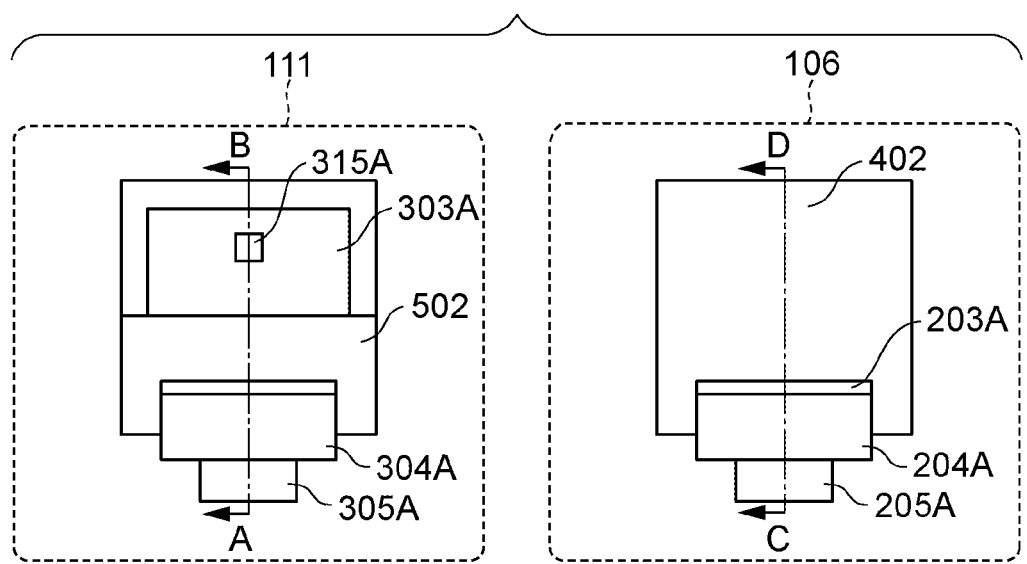
FIG. 5 is a top view illustrating a photoelectric conversion unit and a transfer transistor.

FIG. 5 is a top view illustrating the pixel 106 for image acquisition, a photoelectric conversion unit PD in the pixel 111 for failure detection, and the transfer transistor M1. Like numbers refer to like components having like functionality in FIG. 4 and FIG. 5.

First, the pixel 106 for image acquisition will be described. In a planar view, the semiconductor area 203A configured to accumulate electric charges overlaps a P-type semiconductor area 402. The semiconductor area 402 functions as a surface protective layer configured to protect a surface of the semiconductor area 203, which will be described below with reference to FIGS. 6A and 6B. Hereinafter, the semiconductor area 402 may be a surface protective layer.

Next, the pixel 111 for failure detection will be described. In a planar view, a P-type semiconductor area 502 is provided between a part having the failure detection CNT 315A connected in the semiconductor area 303A and the transfer gate 304A.

Figure 6A:
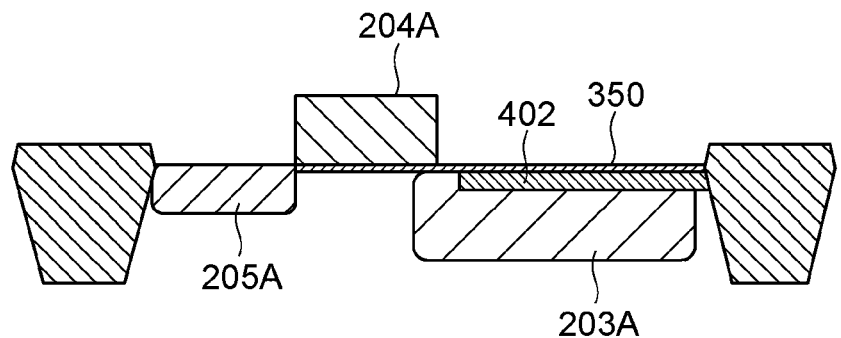
FIGS. 6A and 6B are cross-sectional views of the photoelectric conversion unit and the transfer transistor.
Figure 6B:
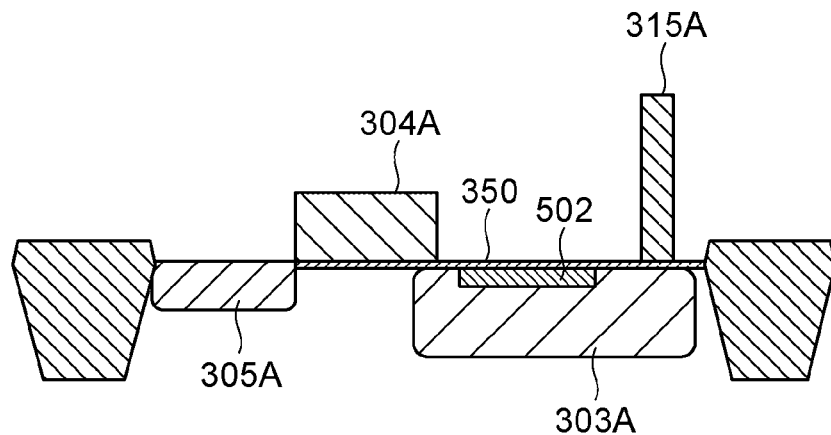

FIG. 6A is a cross-sectional view of the pixel taken at a line C-D in FIG. 5. FIG. 6B is a cross-sectional view of a pixel taken at a line A-B in FIG. 5.

First, the pixel 106 for image acquisition (illustrated in the cross sectional view taken at the line C-D) in FIG. 6A will be described. The semiconductor area 203A configured to accumulate electric charges is provided below the P-type semiconductor area 402. Thus, the semiconductor area 402 functions as a surface protective layer configured to protect a surface of the semiconductor area 203. The semiconductor area 402 is provided between a principal surface (surface) 350 of the semiconductor substrate and the semiconductor area 203A.

Next, the pixel 111 for failure detection (illustrated in the cross sectional view taken at the line A-B) in FIG. 6B will be described. The failure detection CNT 315A is connected to a partial area of the semiconductor area 303A configured to accumulate electric charges. The semiconductor area 502 is not provided below the failure detection CNT 315A. The semiconductor area 502 is provided between a part having the failure detection CNT 315A connected in the semiconductor area 303A and the transfer gate 304A. In a part where the semiconductor area 502 and the semiconductor area 303A overlap each other in a planar view, the semiconductor area 303A is provided below the semiconductor area 502. The semiconductor area 502 is provided between the principal surface 350 of the semiconductor substrate and the semiconductor area 303A.

Effects Provided by Semiconductor Area 502

In a case where the semiconductor area 303A has an N type as its conductivity type, the semiconductor area 502 has a P type as its conductivity type. Therefore, the semiconductor area 502 has a lower potential than that of the semiconductor area 303A. In other words, the semiconductor area 502 has a potential between a potential when the transfer gate 304A has an OFF state and a potential of the semiconductor area 303A. In a case where the semiconductor area 502 is not provided, an electric field corresponding to a potential difference between the transfer gate 304 and the semiconductor area 303A is applied to the transfer gate 304A. On the other hand, according to this embodiment, the semiconductor area 502 is provided so that an alleviated electric field corresponding to a potential difference between the transfer gate 304 and the semiconductor area 502 can be applied to the transfer gate 304. This can prevent easy cause of a failure in the transfer transistor M2 in the pixel 111 for failure detection. In other words, this can prevent easy cause of a failure in the pixel 111 in the pixel configuration of this embodiment. It can further prevent a manufactural failure of the imaging apparatus according to this embodiment. Thus, the imaging apparatus according to this embodiment can advantageously have an improved yield in manufacturing of the imaging apparatus.

Second Embodiment

An imaging apparatus according to a second embodiment will be described with focus on differences from the first embodiment.

In the imaging apparatus according to this embodiment, the failure detection CNT 315A is connected to a semiconductor area provided in an inner part of the semiconductor area 303A, having an identical conductivity type to that of the semiconductor area 303A and having a higher impurity concentration than that of the semiconductor area 303A.

Figure 7:
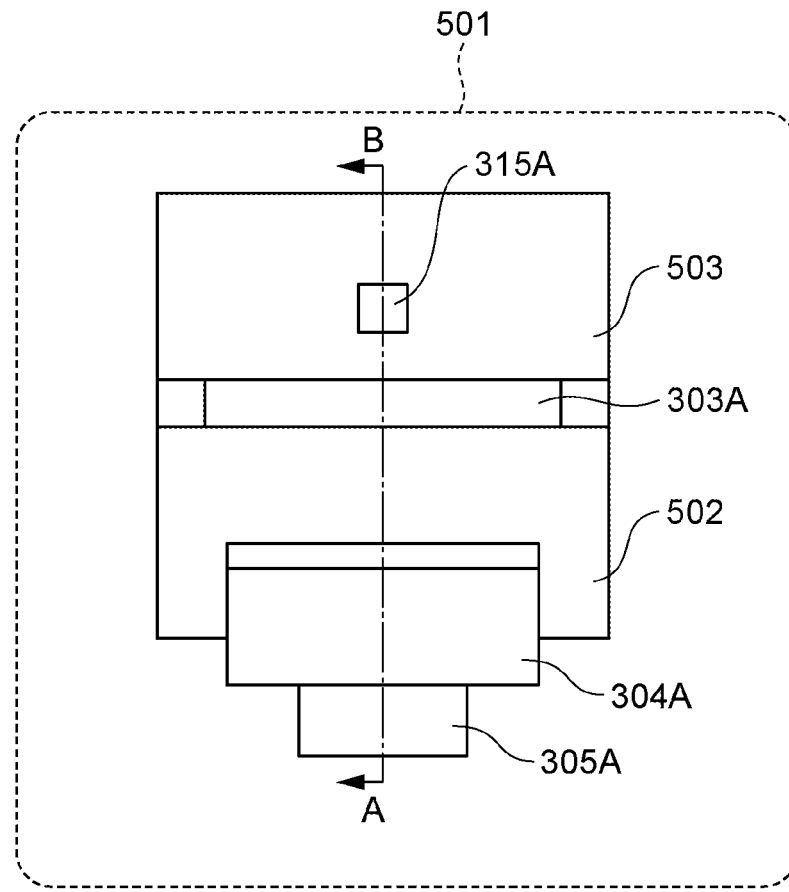
FIG. 7 is a top view illustrating the photoelectric conversion unit and the transfer transistor.

FIG. 7 is a top view of a photoelectric conversion unit and a transfer transistor in a pixel 501 for failure detection according to this embodiment. Like numbers refer to like components having like functionality in FIGS. 3A and 3B and FIG. 5.

In a planar view, a semiconductor area 503 is provided in a part where the semiconductor area 303A does not overlap the semiconductor area 502. The semiconductor area 503 has a conductivity type identical to that of the semiconductor area 303A and has a higher impurity concentration than that of the semiconductor area 303A. In a planar view, a gap is provided between the semiconductor area 503 and the semiconductor area 502.

Figure 8:
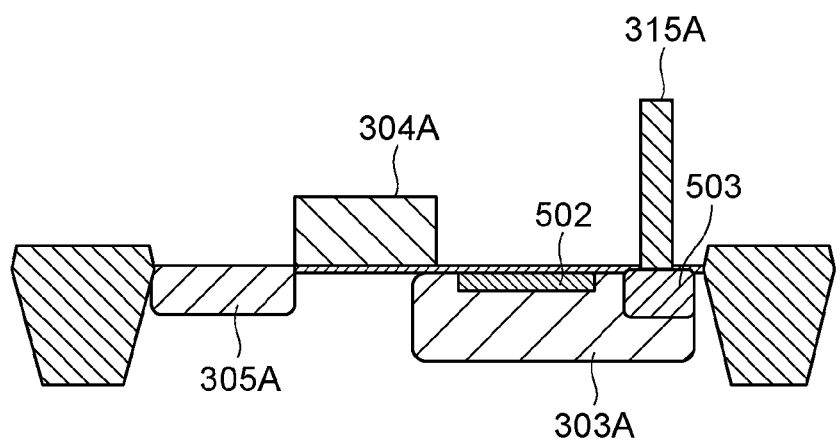
FIG. 8 is a cross-sectional view illustrating the photoelectric conversion unit and the transfer transistor.

FIG. 8 is a cross-sectional view taken at a line A-B illustrated in FIG. 7.

The semiconductor area 503 is provided in an inner part of the semiconductor area 303A. The semiconductor area 503 has its bottom placed at a deeper position than the position of semiconductor area 502.

The imaging apparatus according to this embodiment including the semiconductor area 503 can reduce an electrical resistance between the failure detection CNT 315A and the semiconductor area 303A. This can improve accuracy of failure detection.

Figure 9A:
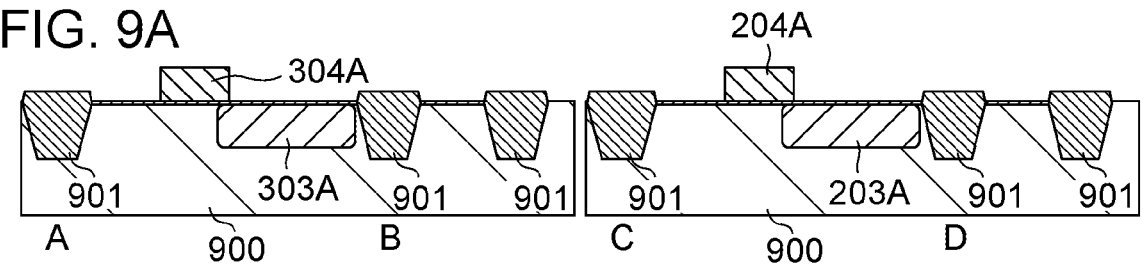
FIGS. 9A to 9E illustrate processes for manufacturing the photoelectric conversion unit and the transfer transistor.
Figure 9B:
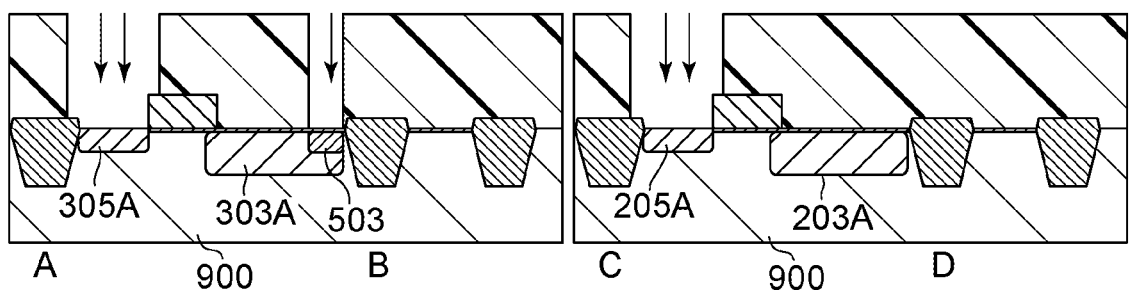
Figure 9C:
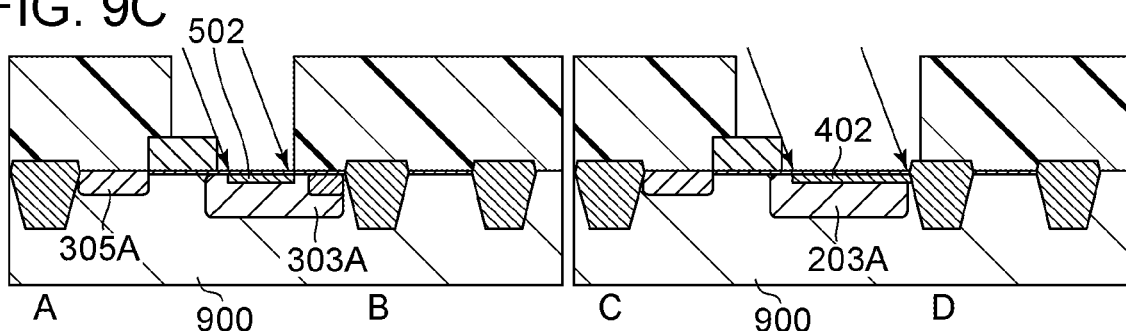
Figure 9D:
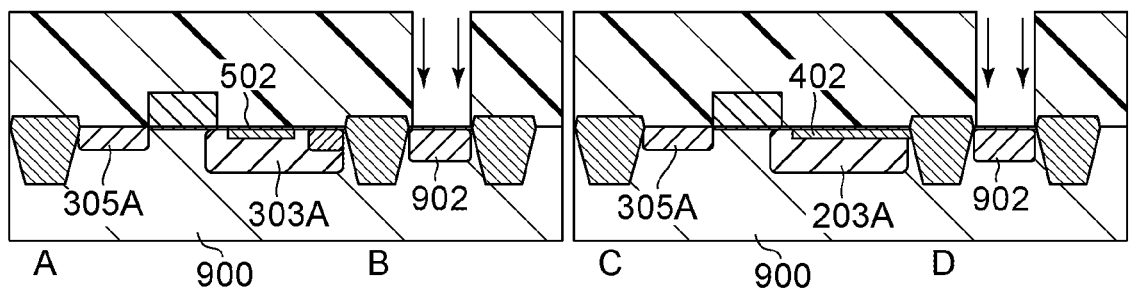
Figure 9E:
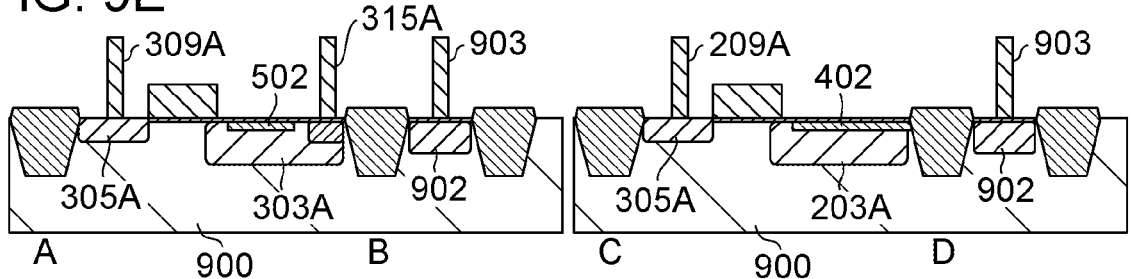

FIGS. 9A to 9E illustrate a method for manufacturing the imaging apparatus according to this embodiment. FIGS. 9A and 9B correspond to FIGS. 7A and 7B. FIGS. 9C and 9D correspond to FIGS. 5C and 5D. FIG. 9E illustrates a configuration of the imaging apparatus according to this embodiment. A P-type semiconductor area 900 is provided across the first area 10 and the second area 11 illustrated in FIG. 1. A P-type semiconductor area 902 is also provided which has a higher impurity concentration than that of the P-type semiconductor area 900. A contact 903 is connected to the semiconductor area 902. The semiconductor area 900 receives a potential from the contact 903 through the semiconductor area 902.

Referring to FIG. 9A, an element isolation unit 901 is provided. The element isolation unit 901 can be formed by using an STI (Shallow Trench Isolation) method or a LOCOS (LOCal Oxidation of Silicon) method. The semiconductor area 303A can be formed by ion implantation. The transfer gate 304A can be formed by a PVD method.

FIG. 9B illustrates a process for forming the floating diffusion area 205A, the semiconductor area 305A, and the semiconductor area 503. An area excluding the area having the floating diffusion area 205A, the semiconductor area 305A, and the semiconductor area 503 is masked by photo resist. In the masked state, a dopant, such as arsenic, for forming an N-type semiconductor area is ion-implanted to areas to be the floating diffusion area 205A, the semiconductor area 305A, and the semiconductor area 503. Thus, the N type semiconductor areas 205A, 305A, and 503 are formed. In other words, the process for forming the semiconductor area 503 is performed in parallel with the processes for forming the semiconductor areas 205A and 305A. This can eliminate necessity for separately performing the process for forming the semiconductor area 503. Therefore, effects can be provided including cost reduction of a semiconductor exposure apparatus because of a reduced number of photolithographic masks or reticles and an improved throughput because of a reduced number of processes.

FIG. 9C illustrates a process for forming the semiconductor area 402 and the semiconductor area 502. The semiconductor area 203A is not masked by a photo resist while a part of the semiconductor area 303A is masked by a photo resist. Furthermore, the semiconductor area 503 is masked by a photo resist. In the area masked by a photo resist, a dopant such as boron for forming a P-type semiconductor area is ion-implanted to an area where the semiconductor areas 402 and 502 are to be formed. The ion implantation may be a so-called angled ion implantation to be performed in a direction tilted with respect to the normal line of the semiconductor substrate. The angled ion implantation produces a projection part of the transfer gate 304A in the semiconductor substrate. This can suppress ion implantation to the projection part. In this manner, the semiconductor areas 402 and 502 are formed in an area defined by the projection part of the transfer gate 304A caused by the angle of the area ion implantation and the mask by a photo resist.

FIG. 9D illustrates a process for forming the semiconductor area 902. An area excluding an area to be the semiconductor area 902 is masked by a photo resist. In the masked area, a dopant such as boron for forming a P-type semiconductor area is ion-implanted to an area where the semiconductor area 902 is to be formed. Thus, the P-type semiconductor area 902 is formed.

After that, an inter-layer insulating film is formed on the semiconductor substrate. An area on which the FD connection CNTs 209A, 309A, 315A, and 903 are to be formed is etched to form openings. The openings are implanted with a metallic material such as tungsten to form the FD connection CNTs 209A, 309A, 315A, and 903. In other words, the process for forming the failure detection CNT 315A is performed in parallel with the process for forming the FD connection CNTs 209A, 309A, and 903. This can eliminate necessity for separately performing the process for forming the failure detection CNT 315A. Therefore, effects can be provided including cost reduction of a semiconductor exposure apparatus because of a reduced number of photolithographic masks or reticles and an improved throughput because of a reduced number of processes.

In this manner, the pixels 110 and 111 for failure detection and the pixels 105 and 106 for image acquisition can be formed in the imaging apparatus according to this embodiment.

Third Embodiment

An imaging apparatus according to a second embodiment will be described with focus on differences from the first embodiment.

In an imaging apparatus according to this embodiment, an active area having a photoelectric conversion unit for pixels for failure detection has a width smaller than a width of an active area having a photoelectric conversion unit for pixels for image acquisition.

Figure 10A:
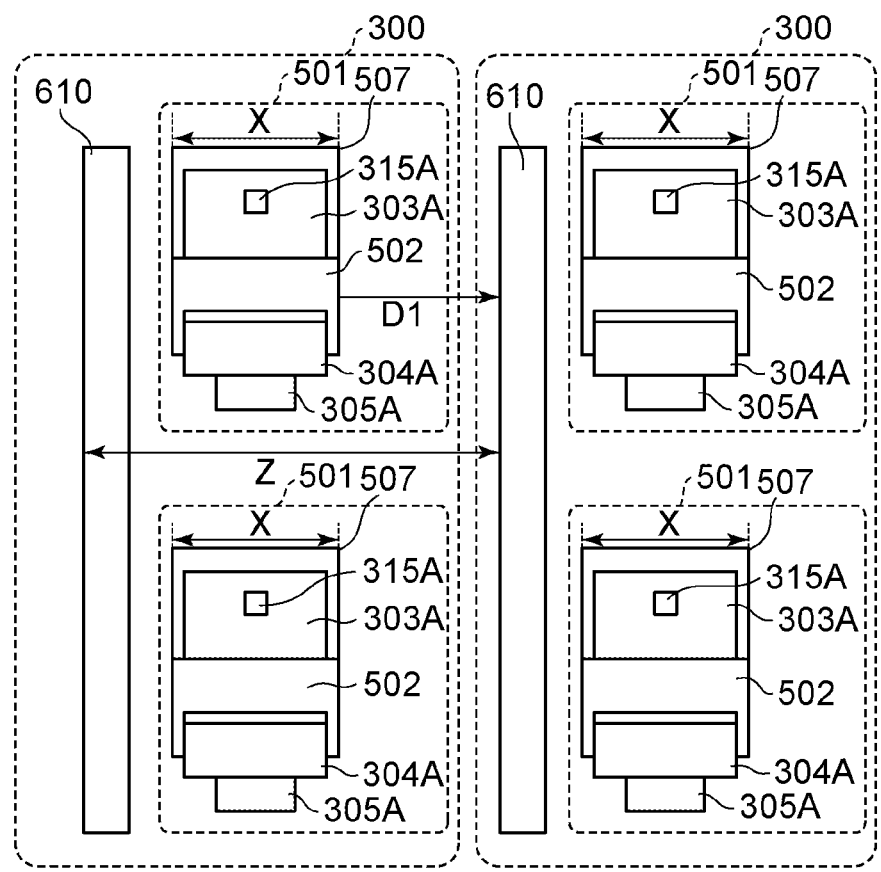
FIGS. 10A and 10B are top views illustrating the photoelectric conversion unit and the transfer transistor and an active area having another transistor thereon.

FIG. 10A is a top view illustrating an active area 610 having a photoelectric conversion unit PD, a transfer transistor M2, an amplification transistor and a selection transistor for a pixel 501 for failure detection according to this embodiment.

The photoelectric conversion unit PD is provided in an active area 507. Referring to FIG. 10A, the active area 507 of the photoelectric conversion unit PD of the pixel 501 for failure detection has a width X. The width X is a length of the active area 507 in a direction intersecting with a direction of extension of the vertical output line 108 illustrated in FIG. 4.

Figure 10B:
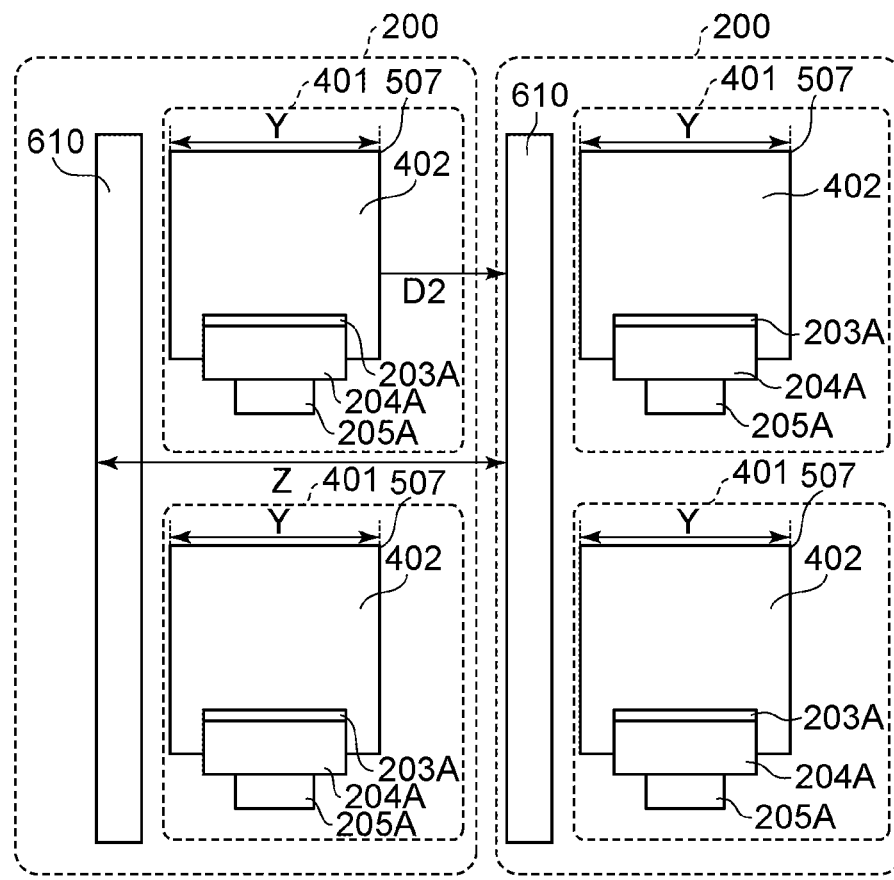

On the other hand, FIG. 10B is a top view illustrating an active area 610 having a photoelectric conversion unit PD, a transfer transistor M2, an amplification transistor and a selection transistor for a pixel 401 for image acquisition according to this embodiment.

The photoelectric conversion unit PD is provided in the active area 507. Referring to FIG. 10B, the active area 507 of the photoelectric conversion unit PD of the pixel 401 for image acquisition has a width Y. The width Y is a length of the active area 507 in the direction intersecting with the direction of extension of the vertical output line 108 illustrated in FIG. 4.

Referring to FIG. 10A, a distance from the semiconductor area 303A in one pixel cell 300 to the active area 610 having the transistors in another pixel cell 300 is equal to D1. Referring to FIG. 10B, a distance from the semiconductor area 203A in one pixel cell 200 to the active area 610 having the transistors in another pixel cell 200 is equal to D2. According to this embodiment, the width X is smaller than the width Y. Thus, the distance D1 can be larger than the distance D2. This can alleviate an electric field generated between the semiconductor area 303A in one pixel cell 200 and the active area 610 in another pixel cell 200. This can prevent easy cause of a failure in the transistor or photoelectric conversion unit PD formed in the active area 610.

Fourth Embodiment

An imaging apparatus according to a fourth embodiment will be described with focus on differences from the second embodiment.

This embodiment will be described with reference to FIG. 11. Like numbers refer to like components having like functionality in FIG. 7 and FIG. 11.

Figure 11:
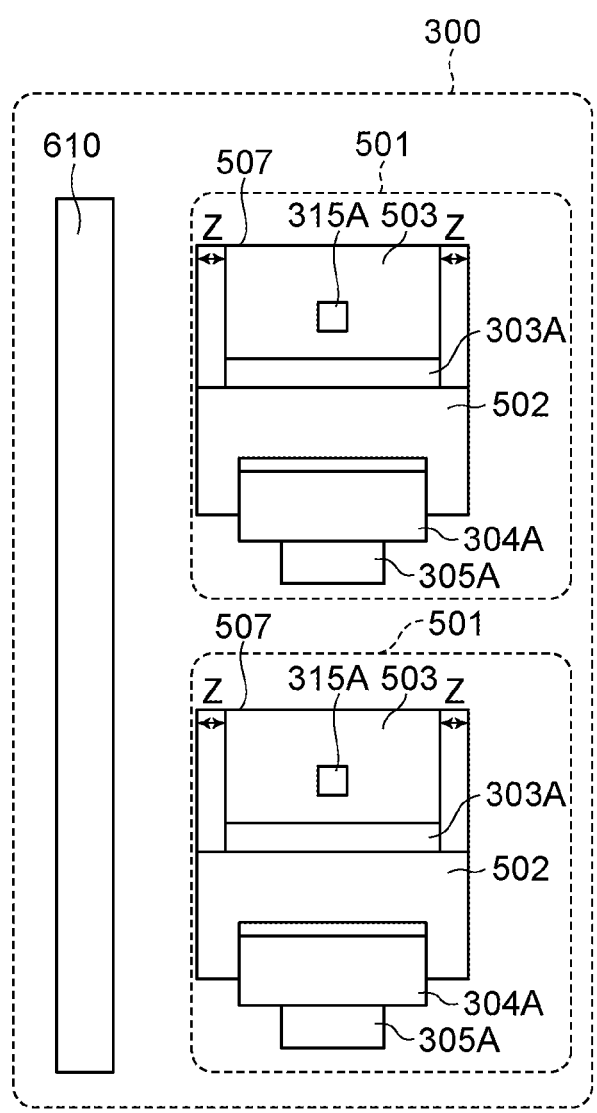
FIG. 11 is a top view illustrating the photoelectric conversion unit and the transfer transistor, and an active area having another transistor thereon.

FIG. 11 is a top view of a pixel cell 300 for failure detection.

Referring to FIG. 11, the active area 610 having the amplification transistor M3 and the selection transistor M4 is neighboring to the pixel 501 in a pixel cell 300 for failure detection. The N-type semiconductor area 503 has a higher impurity concentration than that of an N-type semiconductor area 303A. The active area 507 for the photoelectric conversion unit PD is provided inside by a distance Z from an end. The distance Z is a distance from an end of the active area 507 for the photoelectric conversion unit PD to an end of the semiconductor area 503 in a direction intersecting with a direction of extension of the vertical output line 108 illustrated in FIG. 4.

In the imaging apparatus according to this embodiment, the distance Z can alleviate an electric field caused between the photoelectric conversion unit PD and the active area 610. This can prevent easy cause of a failure in the transistor or photoelectric conversion unit PD formed in the active area 610.

Fifth Embodiment

Figure 12:
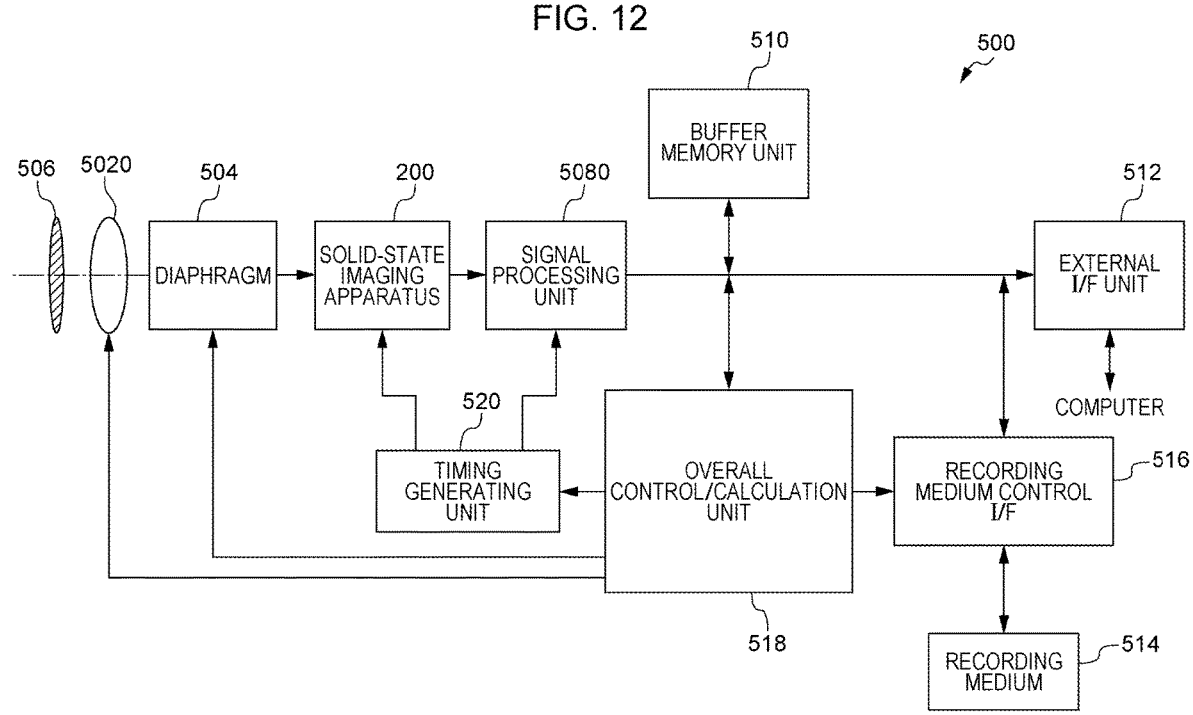
FIG. 12 is an overall view illustrating an imaging system.

FIG. 12 is a block diagram illustrating a configuration of an imaging system 500 according to a fifth embodiment. The imaging system 500 according to this embodiment includes an imaging apparatus 200 having a configuration of one of the imaging apparatuses according to the aforementioned embodiments. Concrete examples of the imaging system 500 may include a digital still camera, a digital camcorder, and a surveillance camera. FIG. 12 illustrates an example of a configuration of a digital still camera including the imaging apparatus according to any one of the aforementioned embodiments as the imaging apparatus 200.

The imaging system 500 illustrated in FIG. 12 includes the imaging apparatus 200, a lens 5020 configured to form an optical image of an object on the imaging apparatus 200, a diaphragm 504 usable for adjusting the quantity of light to be transmitted through the lens 5020, and a barrier 506 configured to protect the lens 5020. The lens 5020 and the diaphragm 504 are included in an optical system configured to gather light to the imaging apparatus 200.

The imaging system 500 has a signal processing unit 5080 configured to process a signal output from the imaging apparatus 200. The signal processing unit 5080 can perform signal processing operations for correct, compress and then outputting an input signal as required. The signal processing unit 5080 may include a function configured to execute AD conversion processing on a signal output from the imaging apparatus 200. In this case, the imaging apparatus 200 may not necessarily has an AD conversion circuit internally.

The imaging system 500 further includes a buffer memory unit 510 configured to temporarily store image data and an external interface unit (or an external I/F unit) 512 configured to communicate with an external computer, for example. Furthermore, the imaging system 500 further includes a recording medium 514 from or to which image data can be record or read, such as a semiconductor memory, and a recording medium control interface unit (or a recording medium control I/F unit) 516 usable for recording or reading to or from the recording medium 514. The recording medium 514 may be internally contained or detachably mounted in the imaging system 500.

The imaging system 500 further includes an overall control/calculation unit 518 configured to control calculations and an overall digital still camera and a timing generation unit 520 configured to output timing signals to the imaging apparatus 200 and the signal processing unit 5080. Here, such timing signals may be externally input, and the imaging system 500 may include at least the imaging apparatus 200 and the signal processing unit 5080 configured to process a signal output from the imaging apparatus 200. The overall control/calculation unit 518 and the timing generation unit 520 may implement some or all of control functions of the imaging apparatus 200.

The imaging apparatus 200 is configured to output an image signal to the signal processing unit 5080. The signal processing unit 5080 can execute a predetermined signal process on an image signal output from the imaging apparatus 200 and output image data. The signal processing unit 5080 can further generate an image by using an image signal.

An imaging system including an imaging apparatus corresponding to one of the aforementioned embodiments can implement an imaging system which can provide a high-quality image.

Sixth Embodiment

An imaging system and a moving object according to a sixth embodiment will be described with reference to FIGS. 13A and 13B and FIG. 14.

Figure 13A:
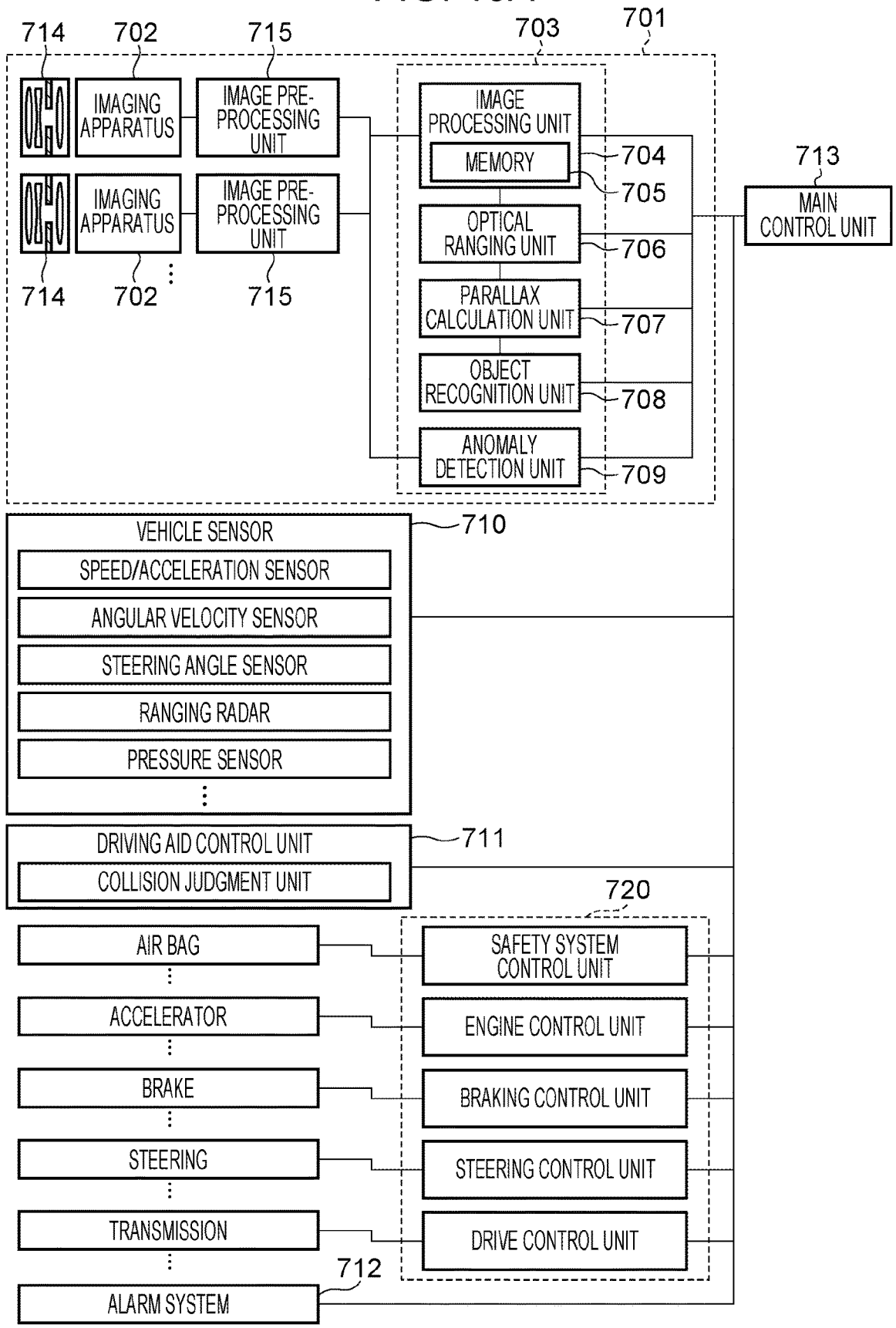
Figure 14:
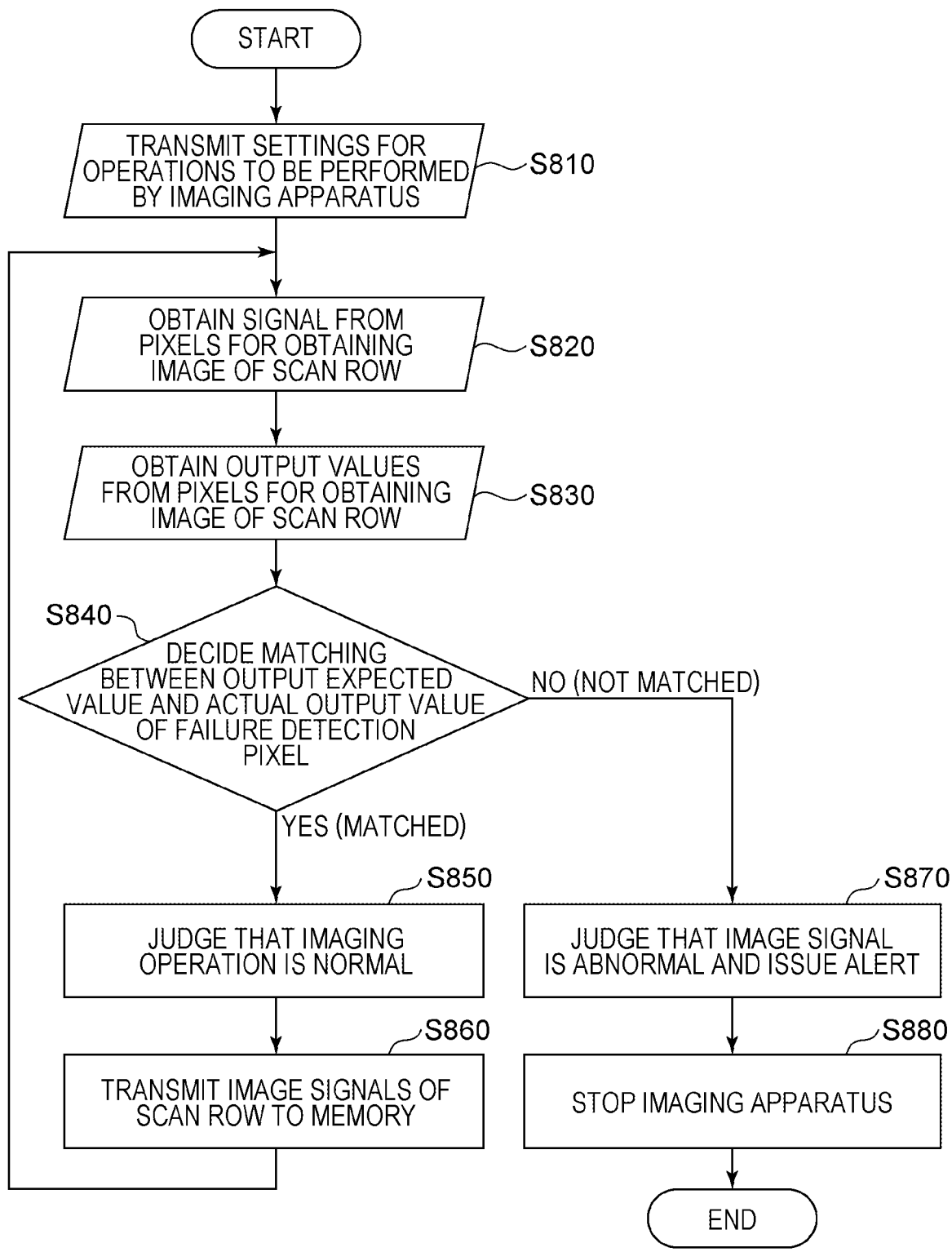
FIG. 14 illustrates a control flow for the moving object.

FIGS. 13A and 13B are schematic diagrams illustrating examples of configurations of the imaging system and the moving object according to this embodiment. FIG. 14 is a flowchart illustrating operations to be performed by the imaging system according to this embodiment.

According to this embodiment, the imaging system relates to an on-vehicle camera, for example. FIGS. 13A and 13B illustrate examples of a vehicle system and the imaging system to be mounted therein. An imaging system 701 includes an imaging apparatus 702, an image pre-processing unit 715, an integrated circuit 703, and an optical system 714. The optical system 714 is configured to form an optical image of an object on the imaging apparatus 702. The imaging apparatus 702 is configured to convert an optical image of an object formed by the optical system 714 to an electric signal. The imaging apparatus 702 is the imaging apparatus according to one of the first to fourth embodiments. The image pre-processing unit 715 is configured to perform a predetermined signal process on a signal output from the imaging apparatus 702. The functionality of the image pre-processing unit 715 may be incorporated into the imaging apparatus 702. The imaging system 701 includes at least two groups of the optical system 714, the imaging apparatus 702 and the image pre-processing unit 715. An output from the image pre-processing unit 715 in each of the groups is input to the integrated circuit 703.

The integrated circuit 703 is an integrated circuit for an imaging system application and includes an image processing unit 704 having a memory 705, an optical ranging unit 706, a parallax calculation unit 707, an object recognition unit 708, and an anomaly detection unit 709. The image processing unit 704 is configured to perform image processes such as development and defect correction on an output signal from the image pre-processing unit 715. The memory 705 is configured to primarily store a captured image and store a defect position of an imaging pixel. The optical ranging unit 706 is configured to focus and range an object. The parallax calculation unit 707 is configured to calculate a parallax (that is a phase difference between parallax images) from a plurality of image data sets obtained from a plurality of imaging apparatuses 702. The object recognition unit 708 is configured to recognize an object such as a vehicle, a road, a sign and a human. The anomaly detection unit 709 is configured to issue an alert to the main control unit 713 when it detects an anomaly in the imaging apparatus 702.

The integrated circuit 703 may be implemented by a specially designed hardware module, a software module, or a combination thereof. The integrated circuit 703 may alternatively be implemented by an FPGA (field programmable gate array) or an ASIC (application specific integrated circuit) or a combination thereof.

The main control unit 713 can administer and control operations to be performed by the imaging system 701, a vehicle sensor 710, a control unit 720, and other units. Without the main control unit 713, each of the imaging system 701, the vehicle sensor 710, and the control unit 720 may individually has a communication interface to receive and transmit a control signal through a communication network (based on CAN standard, for example).

The integrated circuit 703 has a function configured to transmit a control signal or a set value to the imaging apparatus 702 in response to a control signal from the main control unit 713 or under control of a control unit of the integrated circuit 703. For example, the integrated circuit 703 can transmit a setting for pulse-driving the voltage switch 13 within the imaging apparatus 702 or a setting for changing the state of the voltage switch 13 for each frame.

The imaging system 701 is connected to the vehicle sensor 710 and can detect a driving state of the vehicle having the imaging system 701 such as a vehicle speed, a yaw velocity, and a helm position, an environment outside the vehicle, and state of another vehicle or an obstacle. The vehicle sensor 710 corresponds to a distance information obtaining unit configured to obtain distance information from a parallax image to a target object. The imaging system 701 is further connected to a driving aid control unit 711 configured to perform various driving aids such as automatic steering, automatic patrol, and collision prevent functions. A collision judgment function in particular can predict a collision against another car or an obstacle and can judge collision presence or absence based on a result of detection performed by the imaging system 701 or the vehicle sensor 710. Thus, avoidance control can be executed if a collision is predicted, and a safety device can be started when a collision occurs.

The imaging system 701 is connected to an alert apparatus 712 configured to issue an alert to a driver based on a judgment result provided by the collision judgment unit. For example, if the collision judgment unit judges that there is a high possibility of a collision, the main control unit 713 performs vehicle control for avoiding a collision to reduce damage thereof by braking, releasing the accelerator, or suppressing an engine output, for example. The alert apparatus 712 can alert a user by giving an alarm such as a sound alarm, displaying alert information on a screen of a display unit such as a car navigation system or a meter panel, or vibrating a seatbelt or a steering wheel, for example.

According to this embodiment, a surrounding of a vehicle, such as its front or back may be image-captured by the imaging system 701. FIG. 13B illustrates examples of a position of the imaging system 701 in a case where a front side of a vehicle is to be image-captured by the imaging system 701.

The two imaging apparatuses 702 are placed on a front side of the vehicle 700. More specifically, the two imaging apparatuses 702 can be arranged line-symmetrically about an axis of symmetry that is a centerline in the direction of movement or an external form (such as a vehicle width) of the vehicle 700 for obtaining distance information and judging a possibility of a collision between the vehicle 700 and an object. The imaging apparatuses 702 may be placed at positions which do not disturb the field of view of a driver at a driver's seat in order for the driver to visually recognize a state outside the vehicle 700. The alert apparatus 712 may be placed such that it can easily come within the field of view of the driver.

Next, a failure detection operation to be performed by the imaging apparatuses 702 in the imaging system 701 will be described with reference to FIG. 14. A failure detection operation can be performed by the imaging apparatus 702 by following steps S810 to S880 illustrated in FIG. 14.

In step S810, settings for starting up each of the imaging apparatuses 702 are defined. In other words, settings for an operation to be performed by the imaging apparatuses 702 are transmitted from a unit (such as the main control unit 713) external or internal to the imaging system 701, and an operation for image-capturing and a failure detection operation are started by the imaging apparatuses 702. The settings for the operations to be performed by the imaging apparatus 702 include a setting for control over the voltage switch 13.

Next, in step S820, signals are obtained from the pixels 105 and 106 in the first area 10 that is an image acquisition pixel area belonging to a scan row. In step S830, output values are obtained from the pixels 110 and 111 in the second area 11 belonging to the scan row. Step S820 and step S830 may be performed in a reverse order.

Next, in step S840, matching is decided between output expected values from the pixels 110 and 111 based on settings for connection of the fixed voltage terminals V0 and V1 to the pixels 110 and 111 and actual output values from the pixels 110 and 111.

If it is decided in step S840 that the output expected values and the actual output values are matched, the processing moves to step S850 where it is judged that an imaging operation in the first area 10 is being performed normally. The processing then moves to step S860. In step S860, the pixel signals of the scan row are transmitted to and primarily stored in the memory 705. Then, the processing returns to step S820 where the failure detection operation continues.

On the other hand, if it is judged in step S840 that the output expected values and the actual output values are not matched, the processing moves to step S870. In step S870, it is judged that an imaging operation in the first area 10 is abnormal and issues an alert to the main control unit 713 or the alert apparatus 712. The alert apparatus 712 displays on a display unit the fact that an anomaly has been detected. After that, in step S880, the imaging apparatus 702 is deactivated, and the operation of the imaging system 701 is terminated.

According to this embodiment, the processing on the flowchart is looped for each row, for example. However, the processing on the flowchart may be loop for each group of a plurality of rows, or the failure detection operation may be performed for each frame.

According to this embodiment, the control is performed for avoiding a collision against another vehicle. However, embodiments of the present disclosure are also applicable to a control for automatic driving by following another vehicle or a control for automatic driving for preventing the vehicle from marking off a traffic lane. The imaging system 701 can also be applied to a moving object (moving apparatus) such as a ship, an airplane or an industrial robot, without limiting to the vehicle having the imaging system 701. In addition, the imaging system 701 can be applied to a wide variety of apparatuses to be used for object recognition, such as intelligent traffic systems (ITS), without limiting to a moving object.

VARIATION EXAMPLES

The present disclosure can be changed, modified or altered variously, without limiting to the aforementioned embodiments.

For example, some of a configuration of one of the embodiments may be added to another embodiment or may be replaced by some of a configuration of another embodiment, which are also embodiments of the present disclosure.

While the transistors in the pixels 105, 106, 110, and 111 are N type transistors according to the aforementioned embodiments, the transistors in the pixels 105, 106, 110, and 111 may be P type transistors. In this case, the signal levels of the drive signals according to the aforementioned embodiments are reversed.

The circuit arrangement of the pixels described above are not limited to that illustrated in FIG. 2 but can be changed as required. For example, the pixels 105, 106, 110, and 111 may have a dual pixel structure having two photoelectric conversion units for one microlens.

All of the aforementioned embodiments are given only for a purpose of illustration of embodiments of the present disclosure, and it is not intended that the technical scope of the present disclosure be interpreted in a limited manner. In other words, the present disclosure can be implemented in various modes without departing from the spirit and scope or the primary features of the present disclosure. Various combinations of the aforementioned embodiments can be implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging apparatus comprising:
a plurality of pixels on a semiconductor substrate having a surface, wherein
each of the plurality of pixels has a first semiconductor area of a first conductive type;
in a part of the plurality of pixels, a partial area of the first semiconductor area is subject to a potential supplied from a contact; and
a line configured to supply the potential connected to the contact, and the line and a part of the first semiconductor area are overlapped with each other in a planar view viewing from the surface.

2. The imaging apparatus according to claim 1, wherein the part of the plurality of pixels further comprises a floating diffusion and a transfer gate connected to the first semiconductor area and the floating diffusion, and the line passes above the transfer gate of each of the part of the plurality of pixels.

3. The imaging apparatus according to claim 1, further comprising a plurality of lines, wherein
the contact of a first pixel of the part of the plurality of pixels is subject to a potential from a first line of the plurality of lines,
the contact of a second pixel of the part of the plurality of pixels is subject to a potential from a second line of the plurality of lines, and
in the planar view, the first line and the part of the first semiconductor area of the first pixel overlap with each other, and the second line and the other part of the first semiconductor area of the first pixel overlap with each other.

4. The imaging apparatus according to claim 3, further comprising a signal line configured to transmit an output signal of the first pixel and the second pixel, wherein the first line and the second line extend in a direction of extension of the signal line.

5. The imaging apparatus according to claim 3, further comprising a signal line configured to transmit an output signal of the first pixel and the second pixel, wherein the first line and the second line extend in a direction of extension of the signal line.

6. The imaging apparatus according to claim 3, further comprising a plurality of connection lines each positioned at a height between the plurality of lines and the contact, wherein
one of the connection lines is connected to the first line and the contact of the first pixel, and
in the planar view, the one of connection lines and the part of the first semiconductor area of the first pixel are overlapped each other.

7. The imaging apparatus according to claim 6, wherein
the other one of the connection lines is connected to the second line and the contact of the second pixel, and
in the planar view, the other one of connection lines and the part of the first semiconductor area of the second pixel are overlapped each other.

8. An imaging apparatus comprising:
a plurality of pixels on a semiconductor substrate having a surface, wherein
each of the plurality of pixels has a first semiconductor area of a first conductive type;
in a part of the plurality of pixels, a partial area of the first semiconductor area is subject to a potential supplied from a contact;
each of the part of plurality of pixels further has a second semiconductor area of a second conductive type in an area between the first semiconductor area; and
a line configured to supply the potential is connected to the contact, and the line and a part of the second semiconductor area are overlapped with each other in a planar view viewing from the surface.

9. The imaging apparatus according to claim 8, wherein
the part of the plurality of pixels further comprises a floating diffusion and a transfer gate connected to the first semiconductor area and the floating diffusion, and
the line passes above the transfer gate of each of the part of the plurality of pixels.

10. The imaging apparatus according to claim 8, further comprising a plurality of lines, wherein
the contact of a first pixel of the part of the plurality of pixels is subject to a potential from a first line of the plurality of lines,
the contact of a second pixel of the part of the plurality of pixels is subject of a potential from a second line of the plurality of lines, and
in the planar view, the first line and the part of the second semiconductor area of the first pixel overlap with each other and the second line and the other part of the second semiconductor area of the first pixel overlap with each other.

11. The imaging apparatus according to claim 10, further comprising a plurality of connection lines each positioned at a height between the plurality of lines and the contact, wherein
one of the connection lines is connected to the first line and the contact of the first pixel, and
in the planar view, the one of connection lines and the part of the second semiconductor area of the first pixel are overlapped each other.

12. The imaging apparatus according to claim 11, wherein
wherein the other one of the connection lines is connected to the second line and the contact of the second pixel, and
wherein, in the planar view, the other one of connection lines and the part of the second semiconductor area of the second pixel are overlapped each other.

13. The imaging apparatus according to claim 11, wherein, in the planar view, the line and a part of the first semiconductor area are overlapped each other.

14. An imaging system comprising:
the imaging apparatus according to claim 1; and
an image processing unit configured to perform an image process on an output signal from the imaging apparatus.

15. An imaging system comprising:
the imaging apparatus according to claim 1;
an anomaly detection unit configured to detect presence or absence of a failure in the imaging apparatus by using signals output from the part of the plurality of pixels.

16. A moving object comprising:
the imaging apparatus according to claim 1;
a distance information obtaining unit configured to obtain distance information from a parallax image to a target object based on a signal from the imaging apparatus; and
a control unit configured to control the moving object based on the distance information.

17. An imaging system comprising:
imaging apparatus according to claim 8; and
an image processing unit configured to perform an image process on an output signal from the imaging apparatus.

18. An imaging system comprising:
the imaging apparatus according to claim 8;
an anomaly detection unit configured to detect presence or absence of a failure in the imaging apparatus by using signals output from the part of the plurality of pixels.

19. A moving object comprising:
the imaging apparatus according to claim 8;
a distance information obtaining unit configured to obtain distance information from a parallax image to a target object based on a signal from the imaging apparatus; and
a control unit configured to control the moving object based on the distance information.

* * * * *